(12) United States Patent
Schriefer et al.

(10) Patent No.: US 8,862,685 B2
(45) Date of Patent: *Oct. 14, 2014

(54) DATA TRANSMISSION PROTOCOL FOR SYNCHRONIZATION COMMUNICATION BETWEEN TWO COMMUNICATION DEVICES

(75) Inventors: Jörn Schriefer, Griesheim (DE); Jürgen Scherschmidt, Frankfurt (DE); Thomas Peichl, Wöllstadt (DE)

(73) Assignee: Continental Teves AG & Co. oHG (DE)

( * ) Notice: Subject to any disclaimer, the term of this patent is extended or adjusted under 35 U.S.C. 154(b) by 240 days.

This patent is subject to a terminal disclaimer.

(21) Appl. No.: 13/130,080

(22) PCT Filed: Nov. 23, 2009

(86) PCT No.: PCT/EP2009/065647
§ 371 (c)(1),
(2), (4) Date: May 19, 2011

(87) PCT Pub. No.: WO2010/058008
PCT Pub. Date: May 27, 2010

(65) Prior Publication Data
US 2011/0231509 A1    Sep. 22, 2011

(30) Foreign Application Priority Data

Nov. 21, 2008 (DE) .......................... 10 2008 058 554

(51) Int. Cl.
| | | |
|---|---|---|
| H04L 29/06 | (2006.01) | |
| H04L 12/403 | (2006.01) | |
| H04J 3/06 | (2006.01) | |
| H04L 12/40 | (2006.01) | |

(52) U.S. Cl.
CPC ..... *H04L 12/403* (2013.01); *H04L 2012/40273* (2013.01); *H04J 3/0658* (2013.01)

USPC .......... 709/211; 709/208; 709/223; 709/236; 709/238; 714/800

(58) Field of Classification Search
USPC .......... 709/208, 211, 223, 236, 238; 714/800
See application file for complete search history.

(56) References Cited

U.S. PATENT DOCUMENTS

| | | |
|---|---|---|
| 4,750,176 A | 6/1988 | VanVeldhuizen |
| 5,499,374 A | 3/1996 | DiGiulio |
| (Continued) | | |

FOREIGN PATENT DOCUMENTS

| | | |
|---|---|---|
| DE | 19702270 | 9/1998 |
| DE | 102005014783 | 10/2006 |
| (Continued) | | |

OTHER PUBLICATIONS

International Search Report for PCT/EP2009/065647 filed Nov. 23, 2009, mailed Apr. 20, 2010.

(Continued)

*Primary Examiner* — Xavier Szewai Wong
*Assistant Examiner* — Natali N Pascual Peguero
(74) *Attorney, Agent, or Firm* — RatnerPrestia (57) ABSTRACT

An electronic communication system including at least first and a second communication units (master, slave) which are connected to one another by means of at least one first data line, wherein the communication system has a data transmission protocol which is designed such that at least one defined communication process comprises the transmission of a synchronization packet (frame sync) and/or of an identification packet (ID) and/or a command packet (CMD) and/or of an address packet (ADDR) from the first communication unit (master) to at least the second communication unit (slave) via at least the first data line.

16 Claims, 3 Drawing Sheets

(56) References Cited

U.S. PATENT DOCUMENTS

| | | | |
|---|---|---|---|
| 6,467,065 B1 * | 10/2002 | Mendez et al. | 714/800 |
| 6,571,313 B1 * | 5/2003 | Filippi et al. | 711/108 |
| 7,139,613 B2 | 11/2006 | Reinke | |
| 7,278,011 B2 * | 10/2007 | Eisen et al. | 712/218 |
| 7,623,552 B2 * | 11/2009 | Jordan et al. | 370/503 |
| 7,743,273 B2 * | 6/2010 | Ohno | 713/600 |
| 2002/0112070 A1 * | 8/2002 | Ellerbrock et al. | 709/238 |
| 2004/0111536 A1 | 6/2004 | Ellerbrock | |
| 2004/0208200 A1 | 10/2004 | Hejdeman | |
| 2008/0075128 A1 | 3/2008 | Fourcand | |
| 2008/0183929 A1 | 7/2008 | Gottswinter | |
| 2009/0190571 A1 | 7/2009 | Kitz | |

FOREIGN PATENT DOCUMENTS

| | | |
|---|---|---|
| WO | WO01/18989 A1 * | 3/2001 |
| WO | 2006044140 | 4/2006 |
| WO | 2007141508 | 12/2007 |
| WO | 2007144412 | 12/2007 |

OTHER PUBLICATIONS

German Search Report for DE 10 2009 046 995.8 dated Nov. 23, 2009.

* cited by examiner

DATA TRANSMISSION PROTOCOL FOR SYNCHRONIZATION COMMUNICATION BETWEEN TWO COMMUNICATION DEVICES

CROSS REFERENCE TO RELATED APPLICATIONS

This application is the U.S. national phase application of PCT International Application No. PCT/EP2009/065647, filed Nov. 23, 2009, which claims priority to German Patent Application No. 10 2008 058 554.8, filed Nov. 21, 2008, the contents of such applications being incorporated by reference herein.

FIELD OF THE INVENTION

The invention relates to an electronic communication system, a method for data transmission between at least one first communication unit and at least one second communication unit and the use of the communication system in motor vehicles.

BACKGROUND OF THE INVENTION

In the field of serial bus systems, for example, the prior art proposes data transmission protocols which are subject to severe restrictions in respect of their flexibility when being optimized for their application.

SUMMARY OF THE INVENTION

An object of the invention is to propose a communication system and a method for data transmission which allow relatively flexible communication between at least one first communication unit and at least one second communication unit.

It is preferred for the data transmission protocol to be designed such that the first communication unit in a first data transmission mode transmits a data signal and a data request signal or clock signal essentially simultaneously and/or the clock signal embedded in the data signal and/or a common data clock signal via the first data line at least to the second communication unit.

At least the second communication unit is preferably designed such that it can receive and automatically interpret an identification packet and/or a command packet and/or an address packet and/or an ending packet from the first communication unit.

It is expedient that at least the second communication unit is designed such that it interprets the identification packet as a subscriber identification or instruction identification and, on the basis of this interpretation, automatically puts itself into a defined mode of operation and/or awaits further packets and/or transmits a defined response to the first communication unit and/or automatically prompts and executes an internal activity, said internal activity particularly comprising the storage of a defined data item or of a plurality of defined data items at one or more defined memory addresses.

A subscriber identification is preferably understood to mean an identification which is used to name or define the one or more receiver(s) or subscriber(s) or communication partner(s) in a defined communication process.

At least the second communication unit is preferably designed such that it can interpret the identification packet for a selection from at least two defined identification modes.

It is preferred that at least the second communication unit is designed such that it has at least one instruction identification association unit, particularly in the form of a table unit, which assigns to at least one defined instruction identification from an identification packet the content of one or more memory cells in the second communication unit for the purpose of executing a defined instruction which is at least partially stored in said at least one memory cell. In this case, this instruction particularly preferably comprises at least one command packet, at least one address packet and one or more data packets.

It is expedient that the data transmission protocol is designed such that the command packet contains at least one information item about whether read or write access is intended to be performed and/or whether single or multiple access is intended to be performed and/or whether direct or indirect memory access is intended to be performed.

It is preferred that the data transmission protocol and at least the second communication unit are designed such that the content of the one or more memory cells in the second communication unit, which are associated with a defined instruction identification by means of the instruction identification association unit, is at least partially overwritten by the second communication unit by virtue of the reception and interpretation of defined packets or at least one defined message, particularly at least one defined command packet, one or more defined address packets and one or more defined data packets. This allows the instruction, which is associated with a defined instruction identification, to be changed or overwritten.

The method is preferably developed further by virtue of the first communication unit transmitting a synchronization packet via at least the first data line to at least the second communication unit at the beginning of a defined, in particular self-contained, communication process with at least the second communication unit. As an alternative preference or in particular additionally, the second communication unit transmits a synchronization packet at least to the first communication unit at the beginning of a dedicated transmission process.

It is preferred that a defined communication process additionally, in particular subsequently, involves a message being transmitted from the first communication unit to the second communication unit and/or a message being transmitted from the second communication unit to the first communication unit via at least the first data line.

It is expedient that the identification packet is interpreted at least by the second communication unit as a subscriber identification or instruction identification, on the basis of which the second communication unit puts itself into a defined mode of operation and/or awaits further packets and/or on the basis of which the second communication unit transmits a defined response to the first communication unit and/or automatically prompts and executes an internal activity, said internal activity particularly comprising the storage of a defined data item or of a plurality of defined data items at one or more defined memory addresses.

It is preferred that at least the second communication unit associates at least one defined instruction identification from an identification packet with an instruction by means of an instruction identification association unit and executes said instruction, which is stored as the content of one or more memory cells in the second communication unit, said instruction particularly comprising at least one data item corresponding to a command packet, at least one data item corresponding to at least one address packet and one or more data items corresponding to at least one data packet.

It is preferred that the first communication unit in a first data transmission mode transmits a data signal and a data request signal/clock signal essentially simultaneously and/or the clock signal embedded in the data signal and/or a common data clock signal via the first data line at least to the second communication unit.

At least the second communication unit preferably has a memory management unit which comprises address data which respectively reference defined memory cells in the second communication unit.

It is preferred that following reception of a command packet which indicates indirect memory access, the address information item from the subsequent address packet points to a memory cell which stores the address information item from another memory cell, to which the memory access is effected or to which the memory access is performed.

It is expedient that the address information item which is stored in a particular memory cell is overwritten for the change of reference for indirect memory access. In this case, said address information item particularly references another memory cell. Such a change of reference is particularly preferably performed within the context of defined communication processes.

A change in a defined instruction, which is associated with an instruction identification, and/or a change of reference is/are preferably performed at runtime within the context of one or more defined communication processes.

The communication system preferably has a data transmission protocol, on the basis of which at least a second data transmission mode for synchronous data transmission involves the first communication unit transmitting a data request signal or a clock signal at least once via the first data line to the second communication unit and the second communication unit transmitting a data signal in response to the data request signal or the clock signal via the first data line to the first communication unit.

The first communication unit and at least the second communication unit are connected to one another preferably via the first data line as a sole data line.

The relatively small number of lines, particularly data lines, particularly preferably a sole data line, on the basis of the second and/or first data transmission mode allows significant cost savings in comparison with communication systems having a plurality of data lines.

Transmission of a data signal and/or of another signal via a line, particularly via the first data line, is preferably understood to mean sending the signal via the line and/or applying the signal to the line.

A clock generator unit is preferably understood to mean a clock or clock unit.

The data transmission protocol is preferably designed such that the data signal from the second communication unit comprises a defined number of bits, in particular precisely one bit, for the second data transmission mode.

It is preferred that the data transmission protocol is designed for the second data transmission mode such that a message, which particularly comprises at least one defined, separately interpretable information item, from the second communication unit to the first communication unit comprises a plurality of data signals. With particular preference, said message comprises precisely one information item.

By way of example, a message is understood to mean an encoded value for a physical variable captured by a sensor element or an operating parameter for a sensor or actuator.

The data transmission protocol is preferably designed, at least for the second data transmission mode, such that the clock signal from the first communication unit and the data signal from the second communication unit are transmitted essentially simultaneously via the first data line.

It is expedient that the first communication unit and at least the second communication unit are connected to one another via an additional ground line or a reference-ground potential line and/or via an additional power supply line. With particular preference, the first data line is furthermore additionally also used as a power supply line, which is subsequently referred to as a two-wire interface.

It is preferred that the data transmission protocol is designed, at least for the second data transmission mode, such that the data signal as output signal from the second communication unit and the clock signal or the data request signal from the first communication unit are overlaid on the first signal line or that the data signal from the second communication unit overdrives the clock signal or the data request signal from the first communication unit on the first data line, said data signal particularly determining the signal value on the first data line.

Preferably, at least the second communication unit has no clock generator unit of its own or it has a clock generator unit which does not operate in sync with a clock generator unit in the first communication unit and/or which has lower clock precision or greater clock fluctuations in comparison with the clock generator unit in the first communication unit.

The second communication unit is preferably designed such that its response time for the data request signal or the clock signal from the first communication unit is within a defined time interval which, in particular, is smaller or shorter than the period duration or a multiple of the period duration of the clock signal from the first communication unit and/or the clock from the clock generator unit in the first communication unit. With particular preference, at least the second communication unit or a first slave unit is designed such that it has a guaranteed response time for at least one defined signal from the first communication unit and is thereby realtime-compatible.

The first communication unit preferably has a data output or data output connection which is directly or indirectly connected to the first data line, wherein the clock signal or data request signal from the first communication unit is provided or applied on said data output or data output connection.

The name "serial peripheral interface" is known for a serial data bus standard which allows bidirectional, synchronous and serial data transmission between a master unit and various slave units. In this context, however, an appropriate communication system comprises at least three lines between the master unit and a first slave unit for a bidirectional data transmission, namely two data lines and one clock line. In the case of a plurality of slave units, each of said units requires an additional select line to the master unit.

The communication system is preferably in the form of a modified serial peripheral interface communication system with a reduced number of lines, particularly with precisely one information transmission line—the first data line, wherein at least the first communication unit and/or at least the second communication unit are essentially designed to comply with a serial peripheral interface standard. In this regard, the first communication unit has particularly at least one data connection and a clock connection which are operated in sync or which are associated with a common clock generator unit. Alternatively, the first communication unit has two data connections, one data connection of which is operated as a data input and one data connection of which is operated as a data output, the data connections being operated in sync with one another. With particular preference, the first communication unit has a data output and a data input, these together being connected directly or indirectly to the first data line.

The communication system preferably has at least one changeover unit which is designed and connected such that it can be used to change over between operation without a separate clock line at least between the first and second communication units and operation on the basis of the serial peripheral interface standard with a separate clock line at least between the first and second communication units. In particular, the changeover unit is actuated by the first communication unit, said first communication unit particularly preferably having an additional changeover connection and said changeover connection quite particularly preferably being connected to the changeover line via at least one connecting line.

The first communication unit and/or the second communication unit preferably have a push-pull stage with a high-side driver and a low-side driver or have a high-side driver with an optional pull-down resistor or a low-side driver with an optional pull-up resistor. In particular, the first and second communication units each have a push-pull stage for applying a respective output signal to the first data line. In this context, a high-side driver is particularly preferably understood to mean an electronic circuit which applies an activated "high" signal to the first data line and/or sets an electrical variable on the first data line to a defined "high" value. Accordingly, a low-side driver in this context is particularly preferably understood to mean an electronic circuit for setting an activated "low" signal or "low" signal value or application of an electrical potential, essentially corresponding to a ground potential.

It is preferred that the first and at least the second communication unit and also the data transmission protocol are designed such that the data signal and/or the data request signal or the clock signal are transmitted using defined current and/or voltage values or by virtue of optical data transmission on the first data line. In this context, provision is made for the data signal and/or the data request signal or the clock signal to be encoded by means of a defined signal form, comprising at least one defined signal edge and/or at least one signal pulse and/or at least one signal pulse pause.

It is expedient that the first communication unit is in the form of a master unit and the second communication unit is in the form of a slave unit and, in particular, the data transmission protocol is designed such that the second data transmission mode is designed as a slave send data transmission mode and/or the first data transmission mode is designed as a master send data transmission mode.

The first communication unit is preferably connected to at least the second communication unit via a two-wire interface which is used to transmit information, particularly in current-encoded form, unidirectionally or bidirectionally. In particular, this involves the second communication device being supplied with electrical power via said two-wire interface.

The second communication unit is preferably integrated in a sensor and/or actuator unit.

The communication system expediently comprises a plurality of "slave" communication units which are each designed essentially in line with the second communication unit and, in particular, are each connected to the first communication unit by means of a sole data line.

It is preferred that the second communication unit takes the second data transmission mode as the basis for sending the data signal in response to the data request signal or the clock signal from the first communication unit within a defined time interval, which, in particular, is smaller than the period duration or a multiple of the period duration of the clock signal from the first communication unit and/or of the clock from a clock generator unit in the first communication unit.

A synchronization packet is expediently understood to mean a signal in explicitly identifiable form and/or a corresponding signal/data train which is designed such that the occurrence thereof or the respective reception time or transmission time or the formation thereof can be used to obtain a synchronization information item which can be used by at least one communication unit to synchronize its own communication with the other communication unit, from which the synchronization packet originates.

It is preferred that a defined communication process, in particular subsequently, involves a synchronization packet and/or an identification packet and/or a command packet and/or an address packet being transmitted from the first communication unit to at least the second communication unit via the first data line. The identification packet can be used by the first communication unit to select the communication subscribers at any time in particular. By sending a synchronization packet, a new communication process can be initiated at any time in particular. Furthermore, the synchronization packet can customize the data transmission speed/rate. By way of example, the identification packet can define the specific selection of communication subscribers within a communication process.

At the end of a defined communication process, an ending packet is expediently transmitted which, in particular, comprises a checksum so that an erroneously transmitted message can be identified.

It is expedient that a defined communication process additionally, in particular subsequently, involves a message being transmitted from the first communication unit to the second communication unit on the basis of the first data transmission mode and/or a message being transmitted from the second communication unit to the first communication unit, on the basis of the first data transmission mode, via the first data line.

It is preferred that the synchronization packet comprises an explicitly identifiable starting block signal which, in particular, has a starting pulse pause of defined length and a starting pulse of defined length and/or has a starting pulse/starting pulse pause signal, wherein the duration ratio of the starting pulse to the starting pulse pause has a defined, in particular explicitly identifiable, magnitude, and/or which has an explicitly identifiable train of starting pulses and starting pulse pauses with a respectively defined duration. With particular preference, at least the second communication unit ascertains a clock reference variable from the explicitly identifiable starting block signal and, with quite particular preference, subsequently uses said clock reference variable to customize its own defined data request signal/clock signal response signal time interval or to customize its own response time.

The identification packet preferably comprises an information item concerning whether the current communication process relates to all further communication units ("broadcast message"), particularly all the slave units connected to the sending communication unit, one or more single communication units, for example just the second communication unit, and these can expect further information or whether one or more or all further communication units are intended to perform one or more defined internal activities or actions ("EID" or "event ID"), as a result of which one or more such internal activities can be prompted in sync. The identification packet can therefore be used to choose between different communication types at runtime or flexibly within a communication process. Furthermore, the communication subscribers or the addressees of the communication or of the respective communication process can be defined.

The command packet preferably comprises an information item regarding the type of the access by the first communication unit to the second communication unit or vice versa and, in this context, particularly whether read access and/or write access is intended to be performed. In this case, the command packet particularly preferably defines whether direct or indirect memory access using an address pointer is effected. In addition, the command packet quite particularly preferably defines whether one or more memory addresses are intended to be accessed and/or whether random access (in the case of a memory address or "random burst" in the case of a plurality of memory addresses) or linear or incremental memory access ("incremental burst" for a plurality of memory addresses) or bit-by-bit access ("read-modify-write") or implicit access ("inherent"), in which the one or more memory addresses are part of the command, is intended to be performed. This type of command packet, which defines at least one of the access operations described above, allows flexible access to be performed at runtime or within a communication process, said access being able to be customized in the form of the command packet by the first communication unit or the master unit, depending on the operating state.

The at least one address packet, which is preferably transmitted after at least one command packet, defines or comprises the information from the one or more memory addresses to which read and/or write access is intended to be effected.

The message preferably comprises a data item or a plurality of data items or data packets, said data item/said data items or data packets particularly having a respectively associated plurality of appropriate data signals which are transmitted via the first data line.

It is expedient that the data transmission protocol is designed such that first of all a synchronization packet is optionally transmitted, then one or more identification packets, particularly a sole identification packet, then one or more command packets, particularly a sole command packet, then one or more address packets, then a message, comprising one or more data packets, or a plurality of messages, particularly a message from the first communication unit to the second and/or a message from the second communication unit to the first, and optionally an ending packet to finish, are transmitted via the first data line.

Within a communication process, single or all packets or portions of a packet, for example the identification packet and/or one or more data packets, are preferably transmitted or sent redundantly, which can increase the reliability of the communication process. The communication units and/or the data transmission protocol are designed particularly for redundant data or packet transmissions of this kind.

Expediently, a redundant inverted data transmission, for example of a message, is effected within a communication process by virtue of access, particularly by means of the command packet, to redundant data sources (same content of at least two different data sources), at least one of which holds the redundant content in a different form or coding (e.g. in inverted form), effecting multiple transmission of a data content in the different form.

Preferably, the identification packet is transmitted redundantly within a communication process by protecting the activities of communication units which are to be synchronized by means of redundant transmission of the "Event ID" by the first communication unit.

As an alternative preference, redundant inverted transmission of the identification packet is effected within a communication process by virtue of the activities of the communication units which are to be synchronized being protected, by means of redundant transmission of the "event ID" by the first communication unit, such that the "Event IDs" which are to be transmitted redundantly are transmitted in a different form (e.g. in inverted form).

Preferably, two redundantly transmitted packets or a redundant pair of packets are combined to form a common packet and, in particular, are transmitted together, with particular preference at least via the first data line.

With particular preference, a status information item is transmitted within a communication process by virtue of the communication unit which is being accessed, for example the second communication unit, transmitting status information in order to notify the unit which is effecting the access, for example the first communication unit, of information about the state of the unit transmitting the data and/or the validity of the data themselves. In particular, a configurable status information item is transmitted by virtue of the communication unit which is being accessed transmitting status information within the communication process in order to notify the communication unit which is effecting the access of information about the state of the unit transmitting the data or the validity of the data themselves, and by virtue of the type and/or number of the status information items which is to be transmitted being configurable. With particular preference, status information configurable at runtime is transmitted by virtue of the communication unit which is being accessed transmitting status information within the communication cycle in order to notify the communication unit which is effecting the access of information about the state of the unit transmitting the data or the validity of the data themselves, and by virtue of the type and/or number of the status information items which are to be transmitted being dependent on the content of a memory cell of the communication units which are being accessed which is able to be changed by at least one other communication unit at runtime.

Expediently, an echo is transmitted within a communication process by virtue of the unit which is being accessed at least partially repeating the information items transmitted via the accessing unit in order to acknowledge correct reception; in particular, an echo from the identification packet and/or from the command packet and/or from the address packet and/or from the ending packet is transmitted by virtue of the communication unit which is being accessed, for example the second communication unit, transmitting an at least partial repetition of the relevant packet to the first communication unit in order to acknowledge or confirm reception of the relevant packet.

The ending packet is preferably transmitted to the first communication unit again as an echo from the communication unit which has been accessed, for example the second communication unit, said echo comprising an at least partial repetition and/or check data formed or calculated on the basis of the originally transmitted data/packets. As an alternative preference, the ending packet is transmitted from the accessing unit, for example the first communication unit, to the other communication unit(s) as an at least partial repetition and/or check data packet at the end of a communication process.

It is preferred that a time reference for determining the age of a data item is transmitted within a communication process by virtue of the unit which is being accessed, for example the second communication unit, forming a time information item for the age of data and transmitting said time information item with the data to the accessing unit.

Preferably, a counter for an internal time reference is transmitted within a communication process by virtue of the unit which is being accessed forming a time information item for the age of data and transmitting said time information item with the data to the accessing unit, wherein the time information item is formed by counting K2-internal events (e.g. internal timer). As an alternative preference, a counter for an external time reference (MSG-CNT) is transmitted by virtue of the unit which is being accessed forming a time information item for the age of data and transmitting said time information item with the data to the accessing unit, wherein the time information item is formed by counting events (e.g. the number of communication cycles recognized) which are external to the unit which is being accessed, for example the second communication unit.

The first communication unit or master unit is preferably comprised by a controller and/or an electronic control unit, and at least the second communication unit or first slave unit is comprised particularly by a sensor and/or actuator and/or another electronic control unit.

The data transmission protocol expediently defines a digital interface which provides options for increasing the data transmission rate between components or first and second communication units or master and slave units, which may involve the transmission of not only useful data but also supplementary data for protecting the signal conditioning and the data transfer. Besides the options of increasing safety, interference immunity and robustness of data transmission, digital interfaces provide greater flexibility and scalability than analog interfaces, for example. The sequential data transmission and the correspondingly small number of connecting lines or data lines, particularly the sole data line, allow costs to be reduced for the interface connection and allow potential sources of error as a result of contact problems to be minimized.

The invention described here allows particularly the connection of sensors, actuators and controllers with the minimal number of connecting and communication lines. This has all the advantages of bidirectional digital data transmission as regards transmission safety, interference immunity, robustness and flexibility with reduced costs as a result of the small number of hardware components and standard hardware components (standard serial peripheral interface module), which also reduces the software complexity/code overhead and computation runtime.

The invention accordingly also relates preferably to a communication unit and/or a data transmission method for bidirectional, serial data communication between the first communication unit/master unit, particularly in the form of a microcontroller, and the second communication unit/first slave unit, particularly in the form of a sensor or actuator, with a standard serial peripheral interface. Reduction to just one signal line while retaining the full functionality provides cost-efficient and development-efficient interface implementation. Compatibility with the standardized synchronous serial peripheral interface, which is available on most conventional microcontrollers with 3 signal lines+Slave Select line, is also possible with this one signal line or the first/sole data line and can preferably be realized without additional logical/electronic components or bus drivers. In comparison with analog or quasi-digital transmission, digital data transmission does not corrupt the signal, which is why other useful data can also be transmitted without losses. The tolerances which have disappeared as a result of digital or loss-free data transmission can be distributed elsewhere in the design and mass production of sensors and actuators, which has the effect of reducing costs.

The communication system preferably has an overvoltage protection diode or "transient voltage suppressor diodes (TVS)", which increase the system's ESD robustness, at at least one output/input of at least the second communication unit and/or at least one output/input of all slave units and/or of the first communication unit.

Expediently, the communication system has capacitors on signal lines or at least on the first data line which influence the rise and fall times of the signal edges and hence the emitted spurious radiation in a desired or defined manner.

In order to ensure an "idle high voltage level" for the first communication unit, for example upon initialization, it preferably has a "pull up" resistor which sets the signal value on the first data line to a defined "High" level if no communication subscriber is transmitting data via the first data line.

The communication system expediently has just a single master unit as first communication unit and no separate clock transmission line.

The first communication unit/master unit is preferably connected to, in particular integrated in, an electronic control unit ECU. The ECU particularly preferably receives the data received by the master unit and evaluates said data.

It is expedient that, in accordance with the data transmission protocol, the data request signal from the first communication unit is transmitted periodically with an undefined clock time or sporadically to at least the second communication unit via the first data line.

It is preferred that, in accordance with the data transmission protocol, the data request signal from the first communication unit is used as clock source for the data transfer clock and particularly as clock source for at least one further communication unit with inaccurate timing.

The data request signal is preferably output on or applied to the first data line/common connecting line by the first communication unit. The second communication unit recognizes the data request signal and for its part actuates an appropriate bit of the data signal on the common first data line. As soon as the second communication unit has recognized the request signal from the first communication unit, the sending of the data signal from the second communication unit can begin, in particular regardless of the current data request signal. If the second communication unit is of "dominant" design, the summed signal on the first data line at the time of data acceptance by the first communication unit corresponds to the data signal from the first communication unit without it being absolutely necessary for the data request signal to be disconnected. In this case, both the data request signal and the data signal may be active simultaneously.

For the purpose of transmitting their data and synchronization signals, both the first communication unit and the second communication unit preferably use the same physical variable, for example voltage or current. As an alternative preference, different physical variables are used.

Preferably, the first and second communication units use the same values or value ranges or levels for signal transmission. As an alternative preference, they use different values/value ranges/levels.

If a slave needs to be reconfigured to be the master and vice versa, it is expediently necessary for reconfiguration of the output circuitry to be used to ensure that a slave can overwrite the signals from the master on the single-wire connecting line. It is then possible for the new master to be operated with a standard "serial peripheral interface" module and for the new slave to be operated with an OSPI configuration, for example.

The term OSPI is preferably understood to mean a single-wire serial peripheral interface (one wire serial peripheral interface).

In addition, a slave can preferably also be operated using an OSPI converter, which extracts the clock from the data signal and makes it available on separate lines. It is therefore possible to use slave communication units with standard "serial peripheral interface" modules. The advantage is that the transmission can be reduced in sections to at least one connecting line which contains both data and the clock signal.

A master unit (master) can preferably have one or more slave units or slave communication units or slaves connected to it, with single slave communication units in turn themselves being able to be master units for further subordinate slave communication units. To this end, the first slave communication units, which are used as masters for subordinate slaves, should expediently have separate "serial peripheral interface"/OSPI modules or have the option of decoupling from the primary bus and/or of reconfiguring to a master and slave configuration.

The electronic communication system is preferably based on serial, synchronous data transmission and comprises at least one first communication unit or master unit which initiates the communication and at least one second communication unit or slave unit which reacts thereto, wherein during the communication the time base for the transmission of the data elements in both directions is prescribed by the unit which initiates the communication.

The electronic communication system is preferably in a form for use in the automotive sector.

The electronic communication system is expediently in a form or designed for safety-relevant applications.

The electronic communication system preferably comprises a synchronous or, as an alternative preference, an asynchronous bus.

The invention also relates to the use of the electronic communication system in motor vehicles. In particular, the communication system is provided for connecting sensors, particularly preferably pressure sensors, and/or actuators in a motor vehicle. As an alternative preference, the invention relates to the use of the electronic communication system and the method in automation engineering.

The constantly rising number of sensors, actuators, electrical control and regulatory components within conventional motor vehicles and the simultaneous demand for extended functionalities at the same or lower cost require flexible and demanding opportunities for communication by controllers and sensors/actuators. Since many of these components also have significant influence on driving dynamics in the automotive sector, it is necessary to observe relevant requirements in terms of the safety and robustness of the signals, data and systems, which are met by the communication system and data transmission method according to aspects of the invention, in particular.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
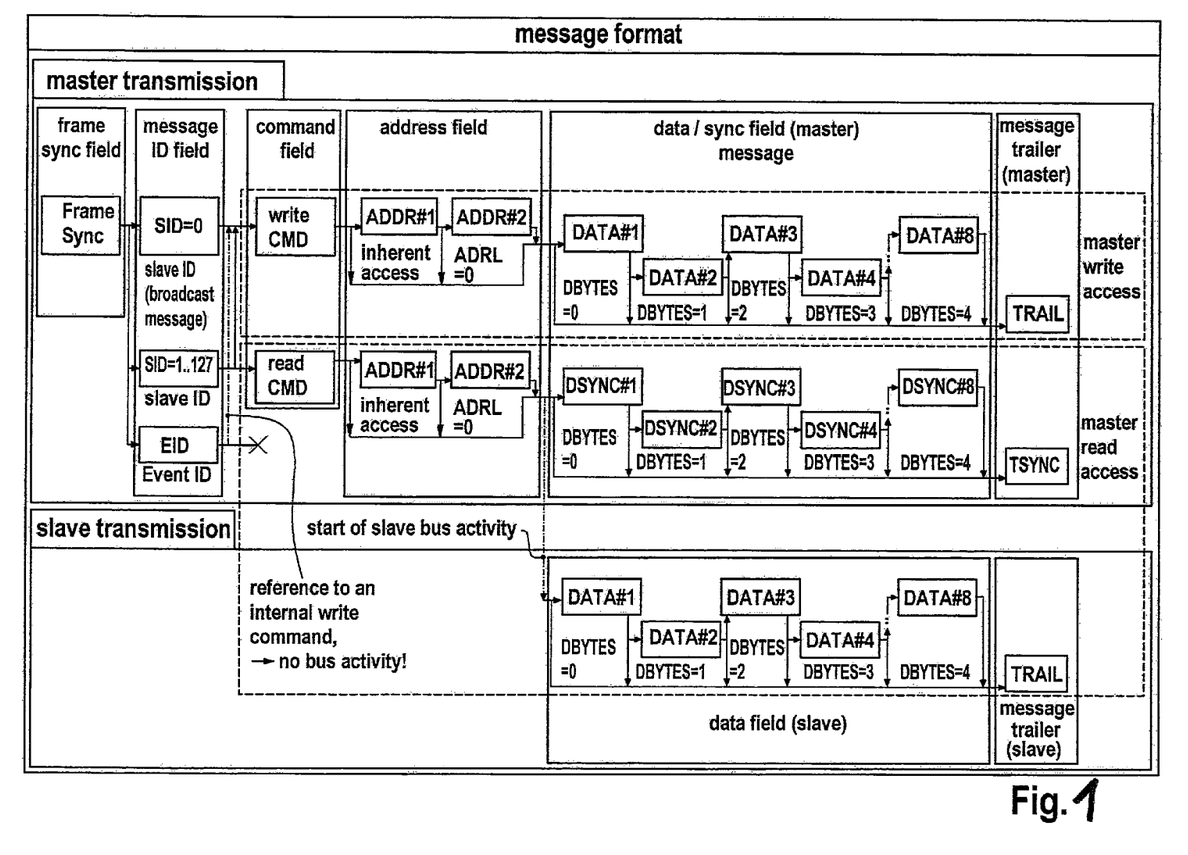
FIG. 1 shows an exemplary data transmission protocol with a particular data format or code format.

FIG. 1 shows the exemplary form of data transmission processes in line with the data transmission protocol, where a message is transmitted from the first communication unit to the second communication unit by means of the first data transmission mode "master transmission" and from the second communication unit to the first communication unit by means of the second data transmission mode "slave transmission". In this case, the message respectively comprises a plurality of data packets DATA#n, which can be distinguished in terms of their sender, that is to say master or slave.

First of all, the first communication unit or the master unit sends a synchronization packet Frame Sync, which is used for synchronizing the communication with the second communication unit or the at least first slave unit or the further bus subscribers and initiates a communication process. This is followed by an identification packet ID, which is used either for identifying the destination by means of a subscriber identification SID (slave ID) or for identifying an executable routine or instruction by means of an instruction identification EID (event ID). By way of example, an EID identification packet produces no further communication in direct fashion because commands and addresses associated with this event are already stored in each slave. When SID=0, further information or instruction packets to all further bus subscribers (broadcast message). By way of example, these are a command packet, comprising a write command write CMD for a pure sending process in the master unit, address packets ADDR#1, ADDR#2 and also a message in the form of data packets DATA#1 to DATA#8. Finally, the communication process comprises the transmission of an ending packet TRAIL which has check data.

In addition, a communication process is illustrated, in which a slave ID (identification) SID from a particular slave unit is sent by the master unit as an identification packet, which is in the form of a subscriber identification. Next, the master unit sends a read command read CMD as a command packet and two address packets ADDR#1, ADDR#2. The slave unit then responds with the data stored at these addresses and sends these data to the master unit. In this case, the master unit sends request signals DSYNC#1 to DSYNC#8 for synchronizing the data transmission of the slave unit, to which the slave unit respectively responds with one of the data packets DATA#1 to DATA#8. This data transmission is terminated with an ending packet TRAIL, which is likewise sent by the slave unit in response to a request packet from the master unit TSYNC.

In line with the example, the master unit and the slave unit communicate exclusively via the first data line as sole data line.

Figure 2:
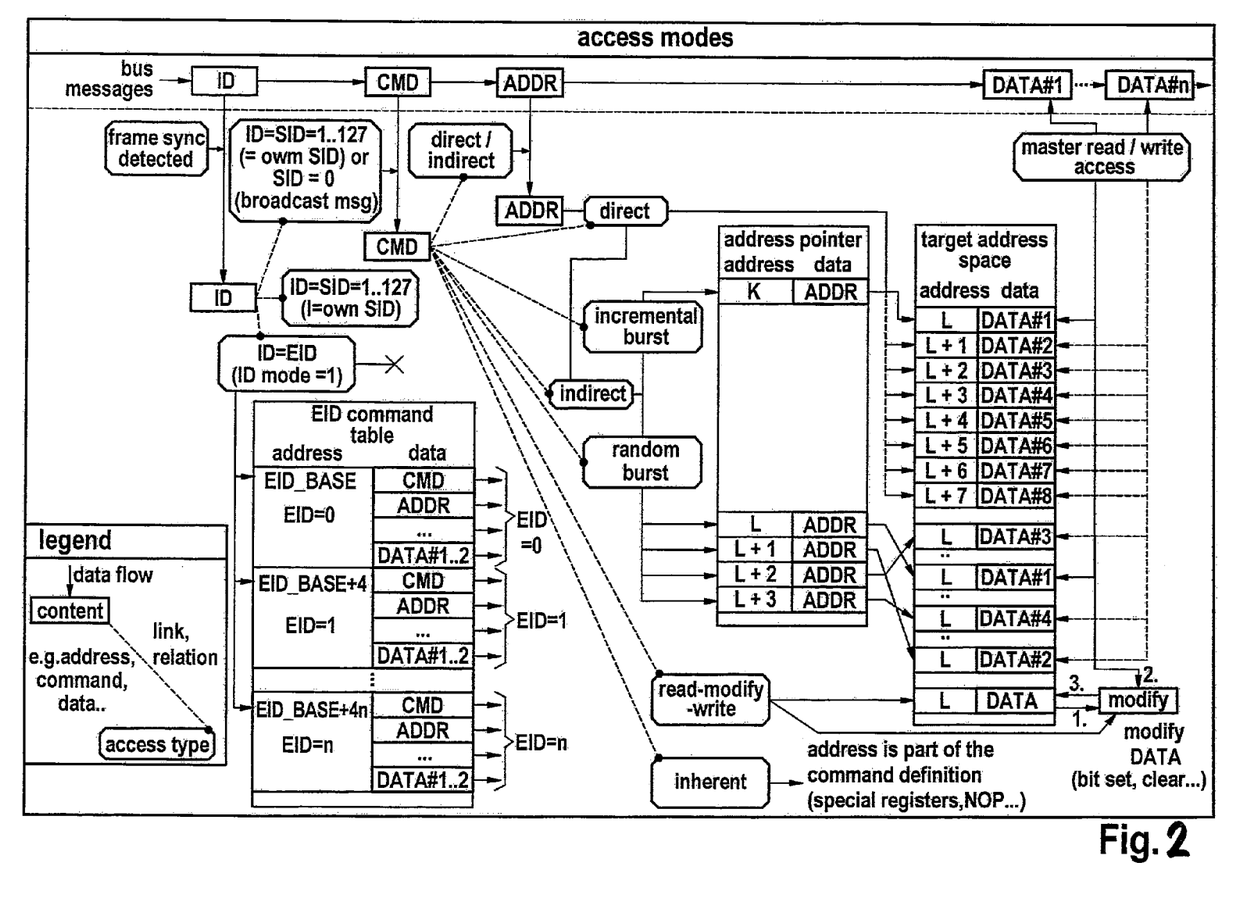
FIG. 2 shows an exemplary embodiment of the data transmission protocol for data access by the initiating unit or first communication unit (master)

FIG. 2 provides an exemplary illustration of the information and signal processing of a second communication unit or of a slave unit in cooperation or in response to a message from the first communication unit or the master unit. In this case, the slave unit detects a synchronization packet or synchronization signal frame sync—not shown—from the master unit at the beginning of the communication process. Subsequently, an identification packet ID sent by the master unit is evaluated. If this contains an instruction identification or an Event ID EID then this event is interpreted using an instruction identification association unit, in the example an EID command table stored as a table unit in the slave, and the relevant instruction or routine is executed using the stored command and address packets, or using the command and address packets referenced by the instruction identification association unit, and the stored data. In this case, this execution takes place, in line with the example, within each slave unit connected to the same bus, wherein the slave units do not respond on the basis of the defined instruction stored for the instruction identification, for example, but rather store possible results only at defined memory addresses of their own.

In line with the example, instruction identifications are also provided which are interpreted only by one or a defined number of slave units such that a defined instruction is executed.

If the identification packet comprises a subscriber identification slave ID SID which comprises one or more bits then the slave unit interprets this as a still incomplete communication process with the master unit and interprets the subsequent command packet CMD, which comprises the information regarding whether read or write access is intended to be effected and whether said access is effected for a direct address directly or indirectly using a pointer and whether said memory access using the pointer is intended to be carried out "linearly" or incrementally, incremental burst, or "randomly", random burst. Alternatively, the command packet CMD may have read or write access, in which case the address is contained implicitly, "inherent", or in which case bit-by-bit access is carried out, "read-modify-write".

In line with the example, the slave unit comprises a memory manager with address pointers—address pointer—and a memory which may comprise registers and/or RAM and/or EEPROM and/or another type of memory. This memory management allows indirect memory access, in line with the example.

At the end of the message, the master unit or the slave unit sends a message or use data in the form of data packets DATA#1 to DATA#n.

Figure 3:
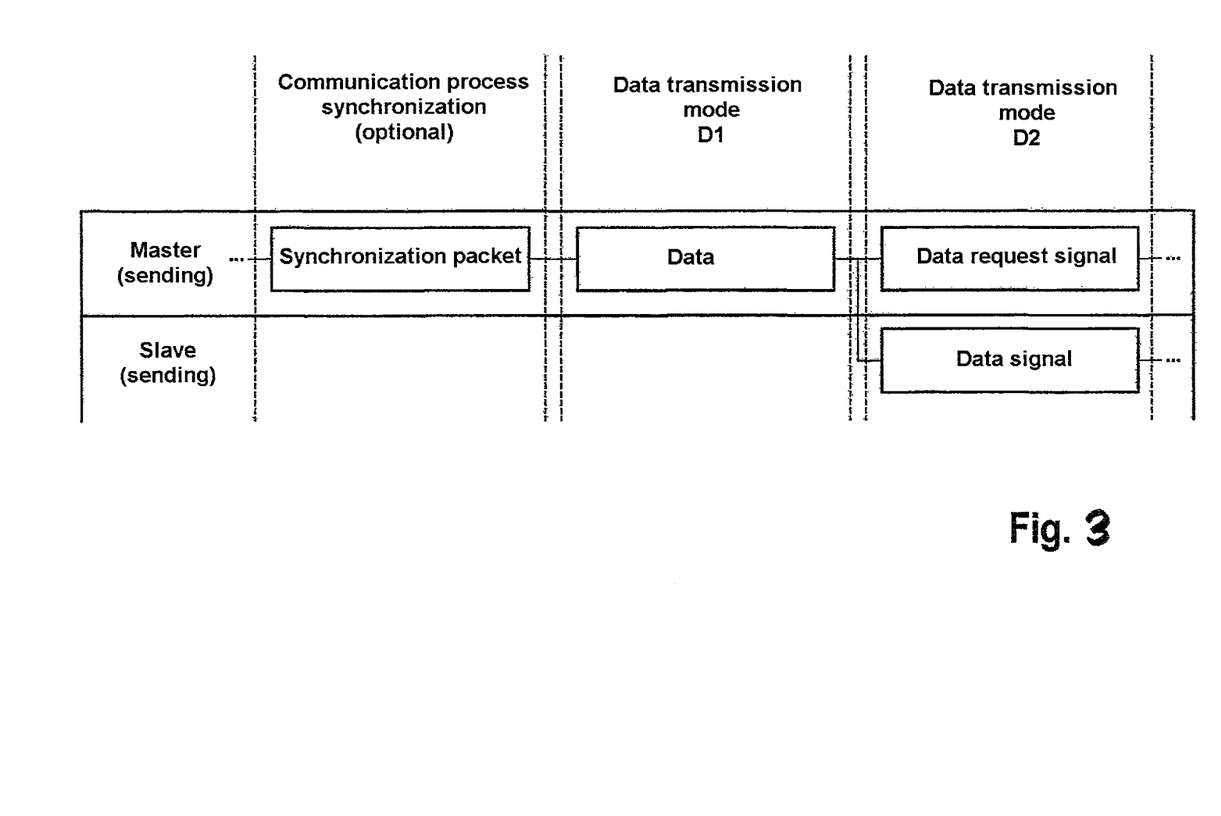
FIG. 3 shows the exemplary bases for the data transmission protocol.

FIG. 3 illustrates the main features of the data transmission protocol by way of example. In a second data transmission mode D2, a slave unit responds with a respective data signal to a data request signal from the master unit. In a first data transmission mode D1, only the master unit sends data or data signals, which are in each case embedded in a clock signal. The synchronization at the start of a new communication process is performed by means of the transmission of a synchronization packet by the master unit.

The invention claimed is:

1. An electronic communication system, comprising: at least first and second communication units which are connected to one another by means of at least one first data line, and a data transmission protocol wherein at least one defined communication process comprises a transmission from the first communication unit to at least the second communication unit via at least the first data line of at least five distinct packets including: a data packet including data, a synchronization packet for synchronizing communication between the first and second communication units, an identification packet for identifying the second communication unit or an event to be executed by the second communication unit, a command packet for instructing the second communication unit to perform at least one of a read and a write operation, and an address packet specifying at least one memory address of a plurality of memory addresses in the second communication unit where the at least one of the read and the write operation will be performed, wherein when the command packet instructs the second communication unit to perform the read operation, data is read from the at least one memory address and transmitted to the first communication unit, and wherein when the command packet instructs the second communication unit to perform the write operation, the data in the data packet is stored at the at least one memory address.

2. The communication system as claimed in claim 1, wherein the data transmission protocol is configured such that the first communication unit in a first data transmission mode transmits a data signal and a data request signal or clock signal essentially simultaneously or the clock signal embedded in the data signal or a common data clock signal via the first data line at least to the second communication unit.

3. The communication system as claimed in claim 1, wherein at least the second communication unit is designed such that it interprets the identification packet as a subscriber identification or instruction identification and, on the basis of this interpretation, automatically puts itself into a defined mode of operation or awaits further packets or transmits a defined response to the first communication unit or automatically prompts and executes an internal activity, said internal activity comprising particularly the storage of a defined data item or a plurality of defined data items at one or more defined memory addresses.

4. The communication system as claimed in claim 1, wherein at least the second communication unit is designed such that it has at least one instruction identification association unit which assigns to at least one defined instruction identification from an identification packet the content of one or more memory cells in the second communication unit for the purpose of executing a defined instruction which is at least partially stored in said at least one memory cell.

5. The communication system as claimed in claim 4, wherein the at least one instruction identification association unit is in the form of a table unit.

6. The communication system as claimed in claim 1, wherein the data transmission protocol is configured such that the command packet contains at least one information item regarding whether read or write access is intended to be performed or whether single or multiple access is intended to be performed or whether direct or indirect memory access is intended to be performed.

7. The communication system as claimed in claim 4, wherein the data transmission protocol and at least the second communication unit are designed such that the content of the one or more memory cells in the second communication unit, which are associated with a defined instruction identification by means of the instruction identification association unit, is at least partially overwritten by the second communication unit by virtue of the reception and interpretation of defined packets.

8. The communication system as claimed in claim 4, wherein the defined packets include at least one defined command packet, one or more defined addressed packets and one or more defined data packets.

9. A method for data transmission between the at least one first communication unit and the at least one second communication unit of the communication system as claimed in claim 1, wherein a defined communication process involves a synchronization packet or an identification packet or a command packet or an address packet being transmitted from the first communication unit to at least the second communication unit via at least the first data line.

10. The method as claimed in claim 9, wherein a defined communication process additionally involves a message being transmitted from the first communication unit to the second communication unit or a message being transmitted from the second communication unit to the first communication unit via at least the first data line.

11. The method as claimed in claim 9, wherein the identification packet is interpreted at least by the second communication unit as a subscriber identification or instruction identification, on the basis of which the second communication unit puts itself into a defined mode of operation or awaits further packets or on the basis of which the second communication unit transmits a defined response to the first communication unit or automatically prompts and executes an internal activity, said internal activity particularly comprising the storage of a defined data item or of a plurality of defined data items at one or more defined memory addresses.

12. The method as claimed in claim 9, wherein at least the second communication unit associates at least one defined instruction identification from an identification packet with an instruction by means of an instruction identification association unit and executes said instruction, which is stored as the content of one or more memory cells in the second communication unit, said instruction comprising at least one data item corresponding to a command packet, at least one data item corresponding to at least one address packet and one or more data items corresponding to at least one data packet.

13. The method as claimed in claim 9, wherein the first communication unit in a first data transmission mode transmits a data signal and a data request signal/clock signal essentially simultaneously or the clock signal embedded in the data signal or a common data clock signal via the first data line at least to the second communication unit.

14. The method as claimed in claim 9, wherein following reception of a command packet which indicates indirect memory access, the address information item from the subsequent address packet points to a memory cell which stores the address information item from another memory cell, to which the memory access is effected.

15. The method as claimed in claim 9, wherein the address information item which is stored in a particular memory cell is overwritten for the change of reference for indirect memory access.

16. The use of the communication system as claimed in claim 1 in motor vehicles.

\* \* \* \* \*